(12) United States Patent
Jauregui Misas et al.

(10) Patent No.: US 9,057,928 B2
(45) Date of Patent: Jun. 16, 2015

(54) EFFICIENT FREQUENCY CONVERSION

(75) Inventors: César Jauregui Misas, Jena (DE); Andreas Tuennermann, Weimar (DE); Jens Limpert, Jena (DE); Dirk Nodop, Jena (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 0 days.

(21) Appl. No.: 13/995,675

(22) PCT Filed: Dec. 19, 2011

(86) PCT No.: PCT/EP2011/006411
§ 371 (c)(1),
(2), (4) Date: Sep. 16, 2013

(87) PCT Pub. No.: WO2012/084179
PCT Pub. Date: Jun. 28, 2012

(65) Prior Publication Data
US 2014/0002890 A1    Jan. 2, 2014

(30) Foreign Application Priority Data
Dec. 21, 2010 (DE) .......................... 10 2010 055 284

(51) Int. Cl.
G02F 1/35 (2006.01)
G02F 1/39 (2006.01)

(52) U.S. Cl.
CPC .............. *G02F 1/3536* (2013.01); *G02F 1/395* (2013.01); *G02F 2201/08* (2013.01); *G02F 2201/14* (2013.01); *G02F 2201/307* (2013.01); *G02F 2202/32* (2013.01)

(58) Field of Classification Search
CPC ............................... G02F 1/3536; G02F 1/395
USPC .................................................. 359/326–332
See application file for complete search history.

(56) References Cited

U.S. PATENT DOCUMENTS 3,875,422 A * 4/1975 Stolen .......................... 359/330
6,043,927 A    3/2000 Islam
(Continued)

FOREIGN PATENT DOCUMENTS

EP    1 306 718 A1    5/2003

OTHER PUBLICATIONS

International Search Report of PCT/EP2011/006411, Apr. 20, 2012.
(Continued)

*Primary Examiner* — Daniel Petkovsek
(74) *Attorney, Agent, or Firm* — Collard & Roe, P.C.

(57) ABSTRACT

The invention relates to an apparatus for generation of electromagnetic radiation, having a pump light source that emits an excitation radiation at a first wavelength, and having an optical waveguide that generates frequency-converted radiation at a second and a third wavelength, by means of degenerate wave mixing, from the excitation radiation of the pump light source.

12 Claims, 3 Drawing Sheets

(56) References Cited

U.S. PATENT DOCUMENTS

Figure 1:
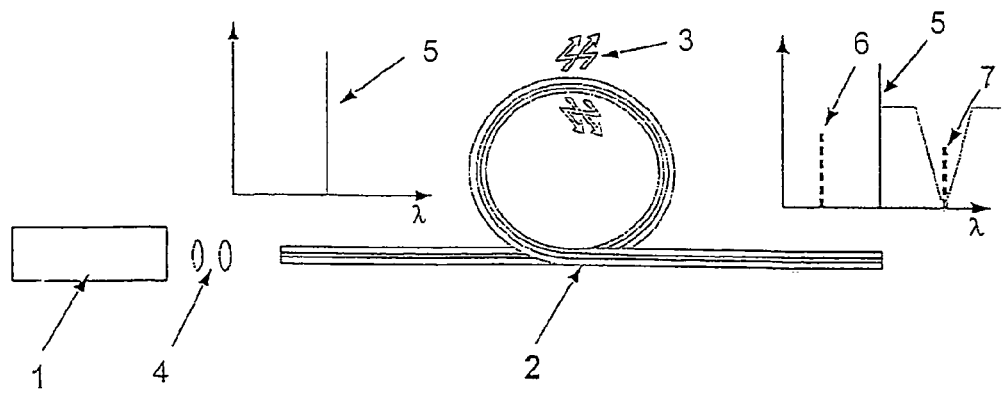

| | | | |
|---|---|---|---|
| 6,522,818 B1 * | 2/2003 | Aso et al. ................. | 385/122 |
| 6,539,153 B2 * | 3/2003 | Taneda et al. ............. | 385/122 |
| 6,744,552 B2 | 6/2004 | Scalora et al. | |
| 6,879,433 B1 | 4/2005 | Yamashita et al. | |
| 7,038,838 B2 * | 5/2006 | Bayart et al. ............. | 359/333 |
| 7,164,526 B2 * | 1/2007 | McKinstrie et al. ........ | 359/330 |
| 2004/0125827 A1 * | 7/2004 | Martinelli et al. ........ | 372/3 |
| 2006/0239604 A1 | 10/2006 | Marhic et al. | |
| 2009/0141340 A1 | 6/2009 | Sharping et al. | |

OTHER PUBLICATIONS

International Preliminary Report on Patentability of PCT/EP2011/006411, Jun. 25, 2013.

Nodop D et al: "Efficient high-power generation of visible and mid-infrared light by degernate four-wave-mixing in a large-mode-area photonic-crystal fiber", Optics Letters, OSA, Optical Society of America, Washington, DC, US, vol. 34, No. 22, Nov. 15, 2009, pp. 3499-3501.

* cited by examiner

EFFICIENT FREQUENCY CONVERSION

CROSS REFERENCE TO RELATED APPLICATIONS

This application is the National Stage of PCT/EP2011/006411 filed on Dec. 19, 2011 which claims priority under 35 U.S.C. §119 of German Application No. 10 2010 055 284.4 filed on Dec. 21, 2010, the disclosure of which is incorporated by reference. The international application under PCT article 21(2) was not published in English.

The invention relates to an apparatus for generation of electromagnetic radiation, having a pump light source that emits an excitation radiation at a first wavelength, and having an optical waveguide that generates frequency-converted radiation at a second and a third wavelength, by means of degenerate wave mixing, from the excitation radiation of the pump light source.

In analysis, in medicine, in military technology, as well as in civil engineering, there is a growing interest in laser sources that emit radiation in refraction-limited and monochromatic manner. The visible wavelength range (VIS) and the mid-infrared wavelength range (MIR) are of particular interest here. These spectral ranges comprise wavelengths of approximately 380-780 nm, and of 1.7-5 μm. Radiation at these wavelengths is particularly required in Raman spectroscopy, combustion monitoring, gas detection, active thermography, or also semiconductor processing. Unfortunately, up to the present, there are no laser sources that have a simple structure and are powerful, and emit monochromatically or coherently. Furthermore, the available sources are very expensive.

For generation of visible radiation, there are various approaches in the state of the art. The usual approach is the development of lasers that emit directly in the visible spectral range. These include semiconductor lasers, dye lasers, and gas lasers. However, these are unsuitable, for the most part, for the applications mentioned above, because they demonstrate an overly low output power. Likewise, non-linear frequency conversion from infrared light to the visible range is often used. The document U.S. Pat. No. 6,744,552 B2, for example, describes a frequency conversion in which a photonic band gap structure is used for sum frequency generation into the visible range from two different wavelengths in the near-infrared range.

For generation of radiation in the mid-infrared spectral range, lasers also exist, in the state of the art, that generate MIR radiation directly or by means of non-linear frequency conversion. In this connection, direct generation takes place by means of solid body lasers (diode lasers) on the basis of exotic materials such as antimony or lead salts, for example. In the case of non-linear frequency conversion, generation of the difference frequency of two frequencies in the near-infrared spectral range takes place utilizing the non-linearity of the second order, for example in periodically poled lithium niobate.

Because the sources that are usually used in the state of the art, as explained above, have little output power and furthermore have a relatively expensive and complex structure, there are also approaches of using apparatuses that contain an optical waveguide. Within the optical waveguide, particularly within an optical fiber, non-linear effects of the third order (four-wave mixing) are used for conversion, in this connection, such as, for example, parametric amplification, degenerate four-wave mixing, and modulation instability.

The document US 2006/0239604 A1 describes coupling in of two excitation wavelengths into a non-linear fiber, for generation of a third wavelength, by means of parametric amplification.

The document U.S. Pat. No. 6,043,927 A describes a system in which new wavelengths are generated by means of modulation instability, using only one pump wavelength. However, the wavelengths generated lie quite close to the pump wavelength.

In addition, apparatuses of the type stated initially exist in the state of the art, which utilize degenerate four-wave mixing (DFWM). The publication "Efficient high power generation of visible and mid-infrared light by degenerated four-wave-mixing in a large mode area photonic crystal fiber," D. Nodop, C. Jauregui, D. Schimpf, J. Limpert, A. Tünnermann, Optics Letters, Vol. 34, No. 22, pp. 3499-3501, 2009, describes a method for generation of visible and MIR radiation using optical large-mode-area fibers. The method is based on the principle of degenerate four-wave mixing (DFWM), in which radiation at two new wavelengths that lie in the desired spectral ranges is simultaneously generated from excitation radiation at a suitable first wavelength (pump wavelength). In this connection, the generated radiation components are coherent and spectrally narrow-band. In this conversion method, however, the disadvantage occurs that the generated radiation components are distorted by re-transfer processes of the pulse energies of the wavelengths involved, so that these consist of multiple peaks. The distorted pulse shape and the resulting limited pulse peak power that is brought about are unsuitable for most applications.

It is therefore the task of the invention to create an apparatus that guarantees an improved pulse shape and conversion efficiency.

This task is accomplished by the invention, proceeding from an apparatus of the type stated initially, in that a filter element that attenuates the radiation of the second or third wavelength is provided.

Because one of the radiation components generated during the DFWM process is attenuated by means of the filter element, undesirable re-transfer processes to the excitation radiation can be prevented. In the apparatus according to the invention, the entire power coupled in propagates in the entry region of the optical waveguide that is used, at the wavelength of the excitation radiation. During propagation through the fiber, the process of degenerate four-wave mixing causes a photon transfer from the first wavelength to the second and third wavelength. This can be imagined to proceed in that two photons at the first wavelength are destroyed, and one photon with a shorter and one with a longer wavelength are generated, in each instance. The attenuating filter element now ensures that the photon count in one of the two newly generated wavelengths is reduced. This leads to non-equilibrium in the photon count of the radiation components involved, and thereby also to non-equilibrium of the propagated powers. Because the photons of the attenuated radiation component are now missing for re-conversion to the first wavelength, the re-transfer process is effectively interrupted. If these attenuation losses are high enough, so that practically all the photons at the attenuated wavelength disappear, almost no re-transfer process will take place any longer. Effectively, this leads to a unidirectional energy flow from the excitation radiation to the radiation at the (second or third) non-attenuated wavelength. The result is a cleanly smoothed pulse that has a clearly higher pulse peak power than in the state of the art.

In this connection, optical waveguides in the sense of the invention can be optical fibers, photonic crystal fibers, photonic band gap fibers, glass fibers with rare earth doping or also polymer fibers.

All the usual sources are possible as pump light sources, particularly microchip lasers, tunable lasers or also fiber lasers.

One embodiment variant provides that the optical waveguide is an optical LMA fiber. A large-mode-area fiber is excellently suited for the apparatus according to the invention, in order to achieve monochromatic, narrow-band radiation. In particular, the large core surface area of the LMA fiber makes it particularly suitable for an apparatus having great output power, also in the case of high-energy radiation in the ps range.

It is furthermore recommended that the optical fiber is a micro-structured endlessly-single-mode fiber. In such fibers, only propagation of the basic mode is possible over a broad spectral range. This automatically maximizes the spatial overlap of the modes of the radiation in the three wavelengths involved.

The invention provides that the second and/or third wavelength lie(s) in the VIS or MIR range of the optical spectrum. In this way, the increased demand for high-energy laser sources within these spectral ranges is taken into account. For generation of the desired spectral radiation components in the VIS and MIR range, the first wavelength, i.e. the excitation radiation of the pump light source, and the material and the other properties of the optical waveguide must be coordinated with one another.

Preferably, the filter element is integrated into the optical waveguide. Such a fiber-integrated filter can be, for example, a grating, particularly a long-period grating, or also an interference filter. Alternatively, it is possible to utilize the material properties of the optical waveguide or the fiber. In this connection, the selection of the glass, the doping, gases or liquids in capillary structures of the fiber, etc., are particular possibilities. In these cases, attenuation takes place, at the second or third wavelength, by means of absorption by the material of the optical waveguide. For example, in the case of an optical quartz glass fiber, the strong absorption in the range of 2.7 nm, caused by molecular transitions of the OH component in quartz glass, can be utilized to improve the conversion efficiency in the visible range. Alternatively or in addition, spectral filtering can take place by means of bending of the fiber. Losses in the guided radiation within the optical waveguide can be brought about, in targeted manner, by means of the bending.

An embodiment of the invention in which the filter element has an attenuation>10 dB/m at the second or third wavelength is particularly advantageous. This attenuation has proven to be suitable for reducing the radiation component to be attenuated, in such a relation to the non-attenuated radiation component, that a re-transfer process is excluded, and the output radiation of the apparatus according to the invention no longer demonstrates any pulse distortion.

According to the invention, the first wavelength should lie in the range of normal dispersion of the waveguide. In this way, the conversion efficiency by means of degenerate four-wave mixing is optimized.

Furthermore, it is recommended that the pump light source is a pulsed ns or ps light source with a pulse peak power of several 10 kilowatt. Such a pump power is sufficient to bring about non-linear generation of the two spectral radiation components within the optical waveguide.

An embodiment variant of the invention provides that the optical waveguide is composed of quartz glass and that the wavelength of the excitation radiation of the pump light source amounts to 1064 nm, whereby the generated radiation components have wavelengths of 673 nm and 2539 nm.

Quartz glass is very well suited as a standard material for optical fibers, for generation of visible and mid-infrared radiation by means of the effect of degenerate four-wave mixing. An excitation radiation having a wavelength in the range of 1064 nm can be made available by a great number of pump light sources. At this pump wavelength, a quartz glass fiber generates a great spectral distance between the spectral radiation components that are generated, whereby in detail, the generated radiation components have a second wavelength of 673 nm and a third wavelength of 2539 nm. To achieve an undistorted pulse, at least one of the generated radiation components must be attenuated by the filter element. In the event that an output radiation in the visible spectral range is desired, the third wavelength at 2539 nm is attenuated. In the event that an output radiation in the MIR range is desired, the visible wavelength component at the second wavelength of 673 nm is attenuated. In this connection, attenuation of the non-desired wavelength can take place by means of spectral filtering by a grating, an interference filter, by means of a corresponding selection of the material properties of the fiber, or by means of bending of the fiber or influencing the guidance properties of the fiber.

Figure 2:
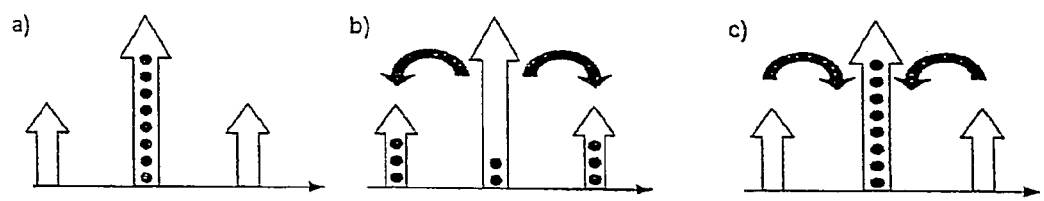
Figure 3:
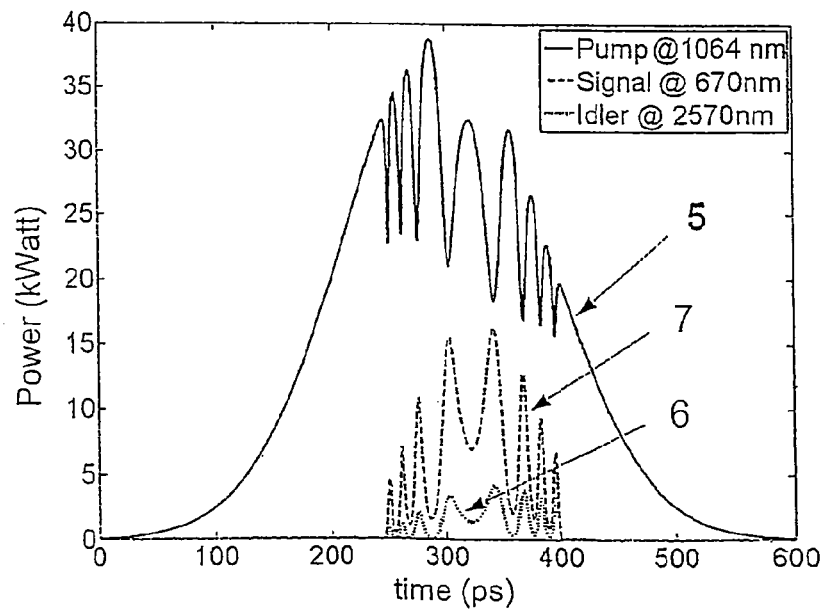
Figure 4:
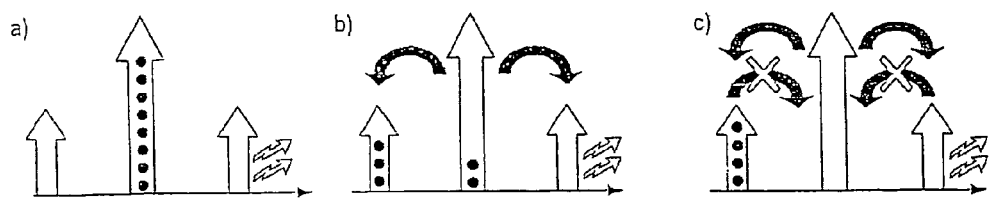
Figure 5:
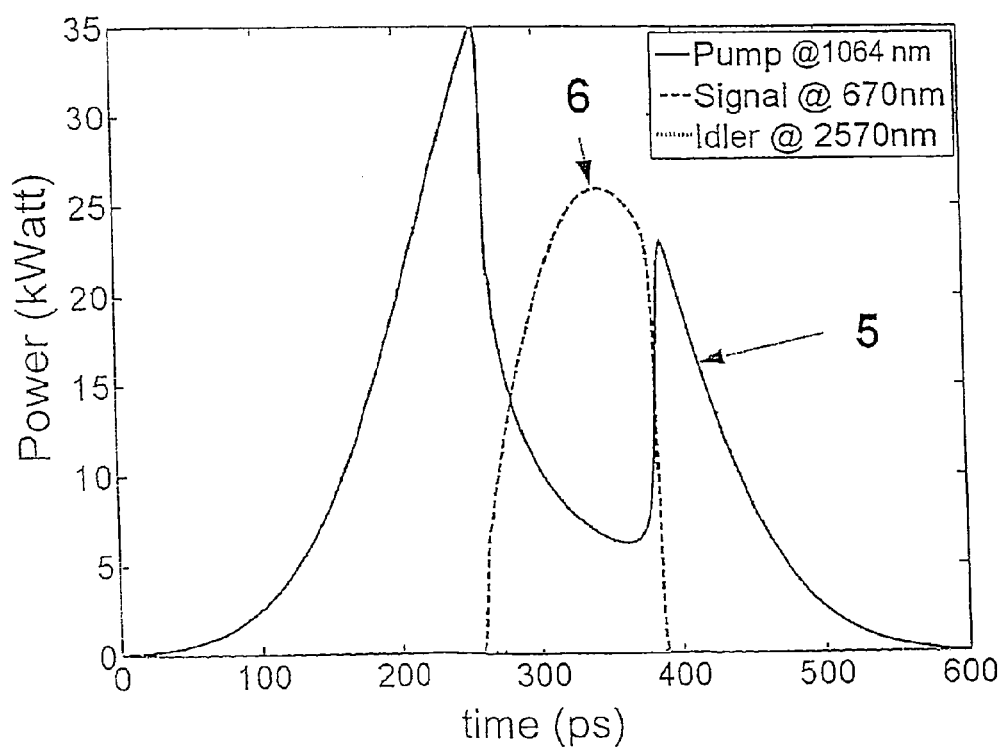
Figure 6:
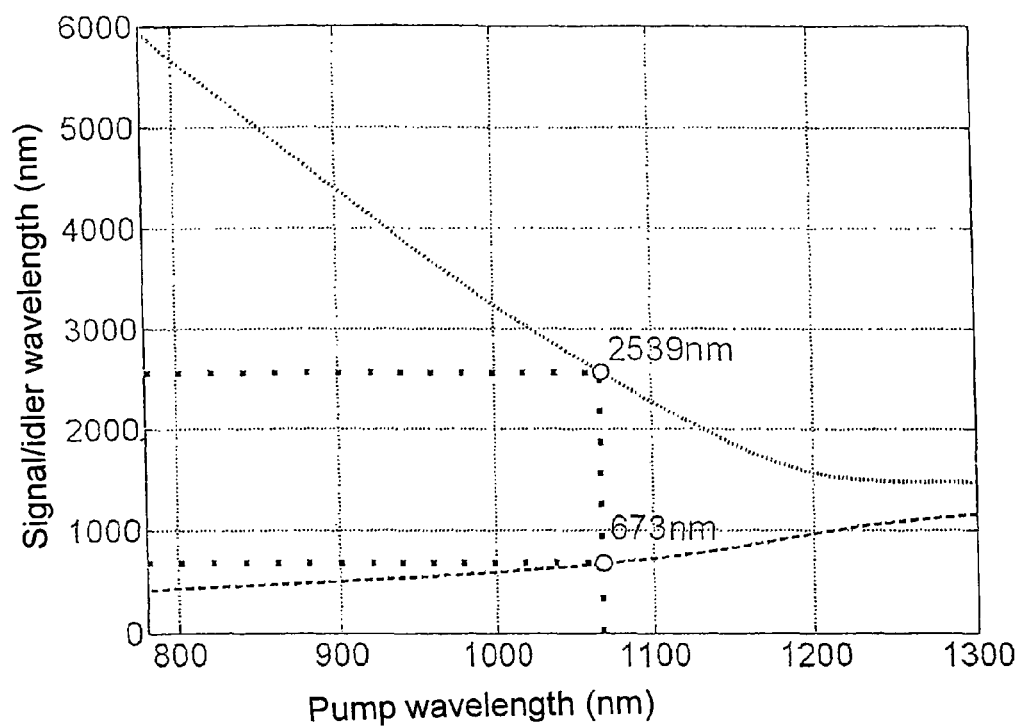

Exemplary embodiments of the invention will be explained in greater detail below, using the figures. These show:

FIG. 1: schematic representation of an apparatus according to the invention;

FIG. 2: illustration of frequency conversion by means of degenerate four-wave mixing;

FIG. 3: time progression of two laser pulses generated according to the state of the art;

FIG. 4: illustration of frequency conversion by means of degenerate four-wave mixing with attenuation, according to the invention, of one of the two wavelengths involved;

FIG. 5: time progression of a laser pulse generated according to the invention;

FIG. 6: a conversion diagram of a quartz glass fiber.

The apparatus according to FIG. 1 has a pump light source 1 as well as an optical waveguide 2 in the form of a fiber. The fiber 2 has a filter element 3, by means of material absorption. Focusing optics 4 are disposed between the pump light source 1 and the fiber 2, which optics focus the excitation radiation of the pump light source 1 onto the entry of the optical fiber 2. The excitation radiation 5 is essentially monochromatic and is emitted by the pump light source 1 at a first wavelength, as illustrated in the diagram shown in the left in FIG. 1. In the fiber 2, frequency-converted radiation with radiation components 6, 7 at a second wavelength and a third wavelength is generated. As is illustrated in the diagram shown in the right in FIG. 1, the radiation component 7 at the third wavelength is attenuated by the filter element 3. At the exit of the optical fiber 2, essentially only the radiation component 6 at the second wavelength leaves the apparatus at the desired power.

In order to guarantee optimal conversion efficiency by means of the apparatus, essentially three requirements must be met. For one thing, the power in the excitation radiation 5 must be sufficiently high, for another, the excitation radiation 5 must be in the range of normal dispersion of the fiber 2 used. And third, the modes of the three radiation components 5, 6, 7 involved must have the best possible spatial overlap in the fiber 2.

Because the invention utilizes degenerate four-wave mixing (DFWM), only monochromatic excitation radiation 5 is required to generate two radiation components 6, 7, at the same time, at first. If the monochromatic excitation radiation 5 is selected correctly, then in this way, in the case of a fiber 2 composed of quartz glass, visible 6 or MIR radiation 7 can be generated.

In the case of the conventional DFWM process according to FIG. 2, the entire excitation radiation 5 that is coupled in propagates at the first wavelength at the beginning of the fiber 2. During propagation, the DFWM process causes a photon transfer from the first wavelength to the second or third wavelength of the two radiation components 6, 7. Two pump photons are thereby destroyed, and a photon having a shorter and one having a longer wavelength are generated, in each instance. This transfer takes place until the photon flow of the excitation radiation 5 and that of the two generated radiation components 6, 7 are equal in size. Subsequently, a change in direction of the energy flow takes place, whereby a photon of the generated radiation components 6, 7 is destroyed, in each instance, in order to generate two photons at the wavelength of the excitation radiation 5 once again. This process takes place until almost no photons at the second and third wavelength are present any longer. Then, the cycle begins anew. The constant repetition of the cycle during a laser pulse leads to multiple peaks in the laser pulse, as shown in FIG. 3. Such so-called bifurcated pulses are unsuitable for many applications. Also, the conversion efficiency and pulse peak power remain far below what would be possible with suppression of the change in direction of the energy flow.

If a filter mechanism is now inserted into the fiber 2, according to the invention, the conditions during the DFWM process change. This situation is shown in FIG. 4. Here again, the entire energy is present in the wavelength of the excitation radiation 5 at the beginning of the fiber 2. When the excitation radiation 5 now propagates in the fiber 2 and the radiation components 6, 7 are generated, the filter element 3 in the form of the bent fiber 2 ensures a reduction in the photon count of the radiation component 7, i.e. at the third wavelength. This leads to non-equilibrium in the photon count of the generated radiation components 6, 7, and therefore also to non-equilibrium of the propagated powers. Because only one photon of the other radiation component 6, 7 is now required, in each instance, to bring about re-conversion to the wavelength of the excitation radiation 5, the re-transfer process is interrupted. If all the filter losses are now high enough, practically all the photons of the attenuated generated radiation component 7 disappear, so that almost no re-transfer process takes place any longer. Effectively, this leads to a unidirectional energy flow from the first wavelength of the excitation radiation 5 to the non-attenuated generated radiation component 6.

FIG. 5 shows the laser pulse of the non-attenuated generated radiation component 6 that results according to FIG. 4. It is shown that the wavelength conversion according to the invention results in smooth pulses with significantly higher conversion efficiency and pulse peak power.

There are several possibilities for bringing about the losses for a generated radiation component 6, 7 in the fiber 2. On the one hand, this is possible by means of the use of filters, such as, for example, long-period gratings, on the other hand by means of utilization of specific absorption lines of the fiber material or of a gas/a liquid, which is/are situated in a capillary structure of the optical fiber 2, for example. It is furthermore possible to bring about the losses by means of bending of the fiber 2.

Degenerate four-wave mixing (DFWM) is a three-wave mixing process that requires phase adaptation of the radiation components 5, 6, 7 involved. At the same time, the principle of the conservation of energy applies in the generation and destruction of the photons of the radiation components 5, 6, 7, in each instance. Phase adaptation and conservation of energy thereby establish the generated radiation components 6, 7 of the DFWM process at a given excitation radiation 5. Not only the wavelengths of the generated radiation components 6, 7 but also their relative spectral distance from one another depend on the fiber dispersion (e.g. material dispersion and waveguide dispersion) and the zero dispersion wavelength of the optical fiber 2. For this reason, the determination of the DFWM radiation components 6, 7 according to the invention can take place by means of a selection of the fiber material and/or of the waveguide properties of the fiber 2.

If a specific spectral distance between the generated radiation components 6, 7 is desired, for example in the VIS and MIR range, then it is necessary to select a fiber material, the material dispersion of which matches the wavelength of a selected excitation radiation 5, as described. FIG. 6 shows the phase adaptation behavior of a quartz glass fiber 2. At an excitation radiation 5 of a first wavelength of 1064 nm, for example, the wavelengths of the generated radiation components 6, 7 amount to 673 nm and 2539 nm.

At wavelengths>3 μm, however, quartz glass has high propagation losses of about 100 dB/m. At longer wavelengths, other materials must therefore be used, such as, for example, chalcogenides, lead oxides or fluorides. In the generation of visible radiation, the loss in the MIR range described above is very useful, however, since here, an intrinsic, material-related loss mechanism is present, which allows efficient generation of visible radiation and simultaneously a clean output pulse shape.

The invention claimed is:

1. An apparatus for generation of electromagnetic radiation, the apparatus comprising
    a pump light source that emits an excitation radiation at a first wavelength, and
    an optical waveguide that generates frequency-converted radiation at a second and a third wavelength, via degenerate wave mixing, from the excitation radiation of the pump light source, and
    a filter element that is integrated into the optical waveguide and that attenuates the radiation at the second or third wavelength, thereby inducing a non-equilibrium in the photon counts at the second and third wavelengths in the optical waveguide such that a re-transfer process from the radiation at the second and third wavelengths to the exciton radiation is interrupted.

2. The apparatus according to claim 1, wherein the optical waveguide is an optical, large-mode-area fiber (LMA fiber).

3. The apparatus according to claim 1, wherein the optical fiber is a micro-structured endlessly-single-mode fiber.

4. The apparatus according to claim 1, wherein the second and/or the third wavelength lie(s) in the VIS or MIR range of the optical spectrum.

5. The apparatus according to claim 1, wherein the filter element is a long-period grating.

6. The apparatus according to claim 1, wherein the filter element is formed by the material properties of the optical waveguide.

7. The apparatus according to claim 1, wherein the filter element has an attenuation >10 dB/m at the second or third wavelength.

8. The apparatus according to claim 1, wherein the first wavelength lies in the range of the normal dispersion of the waveguide.

9. The apparatus according to claim 1, wherein the radiation propagating in the waveguide has a high mode overlap at the first, second, and third wavelength.

10. The apparatus according to claim 1, wherein the pump light source is a pulsed ns or ps light source.

11. The apparatus according to claim 1, wherein the optical waveguide consists of quartz glass.

12. A method for generation of electromagnetic radiation, the method comprising steps of:
  generating an excitation radiation at a first wavelength via a pump light source,
  generating frequency-converted radiation at a second and a third wavelength from the excitation radiation via an optical waveguide, by degenerate four-wave frequency mixing, and
  attenuating via a filter element integrated into the optical waveguide the radiation propagating in the waveguide at the second or third wavelength, thereby inducing a non-equilibrium in the photon counts at the second and third wavelengths in the optical waveguide such that a re-transfer process from the radiation at the second and third wavelengths to the excitation radiation is interrupted.

* * * * *